United States Patent
Kremmer et al.

(10) Patent No.: US 11,470,759 B2
(45) Date of Patent: Oct. 18, 2022

(54) SYSTEM FOR CONTROLLING A WORKING IMPLEMENT CONNECTED TO A VEHICLE

(71) Applicant: Deere & Company, Moline, IL (US)

(72) Inventors: Martin Kremmer, Laumersheim (DE); Tobias Schäfer, Obermoschel (DE)

(73) Assignee: DEERE & COMPANY, Moline, IL (US)

( * ) Notice: Subject to any disclaimer, the term of this patent is extended or adjusted under 35 U.S.C. 154(b) by 165 days.

(21) Appl. No.: 16/820,673

(22) Filed: Mar. 16, 2020

(65) Prior Publication Data
US 2020/0288621 A1 Sep. 17, 2020

(30) Foreign Application Priority Data
Mar. 15, 2019 (DE) .......................... 102019203539.6

(51) Int. Cl.
*A01B 69/00* (2006.01)
*A01B 69/04* (2006.01)
*G05D 1/02* (2020.01)

(52) U.S. Cl.
CPC .......... *A01B 69/004* (2013.01); *A01B 69/008* (2013.01); *G05D 1/0246* (2013.01); *G05D 2201/0201* (2013.01)

(58) Field of Classification Search
None
See application file for complete search history.

(56) References Cited

U.S. PATENT DOCUMENTS

| 9,114,822 B2 | 8/2015 | Prickel et al. |
| 2002/0193928 A1 | 12/2002 | Beck |

(Continued)

FOREIGN PATENT DOCUMENTS

| DE | 10021664 A1 | 11/2001 |
| DE | 10134141 A1 | 2/2003 |

(Continued)

OTHER PUBLICATIONS

European Search Report issued in counterpart application No. 20161817.0 dated Nov. 30, 2020 (05 pages).

*Primary Examiner* — Tamara L Weber
(74) *Attorney, Agent, or Firm* — Hanley, Flight & Zimmerman, LLC

(57) ABSTRACT

A system for controlling a working implement connected to a vehicle, the system comprising: at least one tool mounted on the working implement, the implement and the at least one tool configured to perform an agricultural operation; an automatic steering device associated with the vehicle, the automatic steering device configured to guide the vehicle on an intended vehicle path; an actuator for controlling the lateral position of the working implement relative to the vehicle, the actuator connected to an implement control unit that can be operated to control the actuator in such a way that the working implement is moved on an intended path of the working implement and the implement control unit is set up to compensate a lateral deviation of the vehicle from the intended path of the vehicle through actuation of the actuator; and wherein the implement control unit is programmed to pre-set the actuator after a turning operation in a position in which the effects of the turning operation is compensated.

20 Claims, 4 Drawing Sheets

(56) References Cited

U.S. PATENT DOCUMENTS

| | | | |
|---|---|---|---|
| 2006/0237200 A1 | 10/2006 | Unruh et al. | |
| 2006/0282205 A1* | 12/2006 | Lange | G01C 21/20 701/50 |
| 2008/0195268 A1* | 8/2008 | Sapilewski | G05D 1/0278 701/23 |
| 2010/0006308 A1* | 1/2010 | Schmidt | A01B 69/004 172/1 |
| 2013/0110358 A1 | 5/2013 | Merx et al. | |
| 2013/0186657 A1 | 7/2013 | Kormann et al. | |
| 2017/0144701 A1* | 5/2017 | Medagoda | B62D 6/00 |
| 2019/0059199 A1 | 2/2019 | Stanhope | |

FOREIGN PATENT DOCUMENTS

| | | |
|---|---|---|
| DE | 102014202181 A1 | 8/2015 |
| DE | 102015221120 A1 | 5/2016 |
| DE | 102015009889 A1 | 2/2017 |
| DE | 102016212201 A1 | 1/2018 |
| EP | 1210854 A1 | 6/2002 |
| EP | 1243171 A2 | 9/2002 |
| EP | 1475609 A2 | 11/2004 |
| EP | 1969916 A1 | 9/2008 |
| EP | 2283719 A2 | 2/2011 |
| EP | 2910098 A1 | 8/2015 |
| EP | 3289847 A1 | 3/2018 |
| WO | WO2017075002 A1 | 5/2017 |

* cited by examiner

SYSTEM FOR CONTROLLING A WORKING IMPLEMENT CONNECTED TO A VEHICLE

FIELD OF INVENTION

The present invention concerns a system for controlling a working implement connected to a vehicle specifically wherein the implement has at least one tool for carrying out an agricultural operation and the vehicle is equipped with an automatic steering device for guiding the vehicle on an intended vehicle path.

BACKGROUND

A number of agricultural operations require a working implement to be guided along a desired path so that the operation performed by the working implement is performed in a desired location. Such a location may be a place where a seed particle is to be sowed (with an individual grain machine or a seed drill) or where a plant growing in a field is to be fertilized (with a fertilizer spreader or a field sprayer) or where weeds are to be chopped (with a cultivator) or sprayed (with a field sprayer). Usually such working implements are moved across the field with a vehicle. The vehicle and/or the working implement may be equipped with a position determination system, such as a receiver for a global navigation satellite system (GNSS) and/or a camera with an image processing system that detects characteristics in a field, in particular rows of plants.

For applications that require relatively high accuracy, for example, for chopping for weed removal from a field without damaging the plants, it has been proposed to steer the vehicle in a desired path (based on a camera or a GNSS receiver) and to control an actuator intended for the lateral adjustment of the implement relative to the vehicle (also based on a camera or a GNSS receiver) in order to keep the working implement on the intended path (European Patent Appl. No. EP 2283719 A2, US Patent Publication No. 20130110358, German Patent Appl. No. DE 1020015009889 A1) and thus to compensate for possible steering errors of the vehicle.

SUMMARY

A system for controlling a working implement connected to a vehicle, the system comprising: at least one tool mounted on the working implement, the implement and the at least one tool configured to perform an agricultural operation; an automatic steering device associated with the vehicle, the automatic steering device configured to guide the vehicle on an intended vehicle path; an actuator for controlling the lateral position of the working implement relative to the vehicle, the actuator connected to an implement control unit that can be operated to control the actuator in such a way that the working implement is moved on an intended path of the working implement and the implement control unit is set up to compensate a lateral deviation of the vehicle from the intended path of the vehicle through actuation of the actuator; and wherein the implement control unit is programmed to pre-set the actuator after a turning operation in a position in which the effects of the turning operation is compensated.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
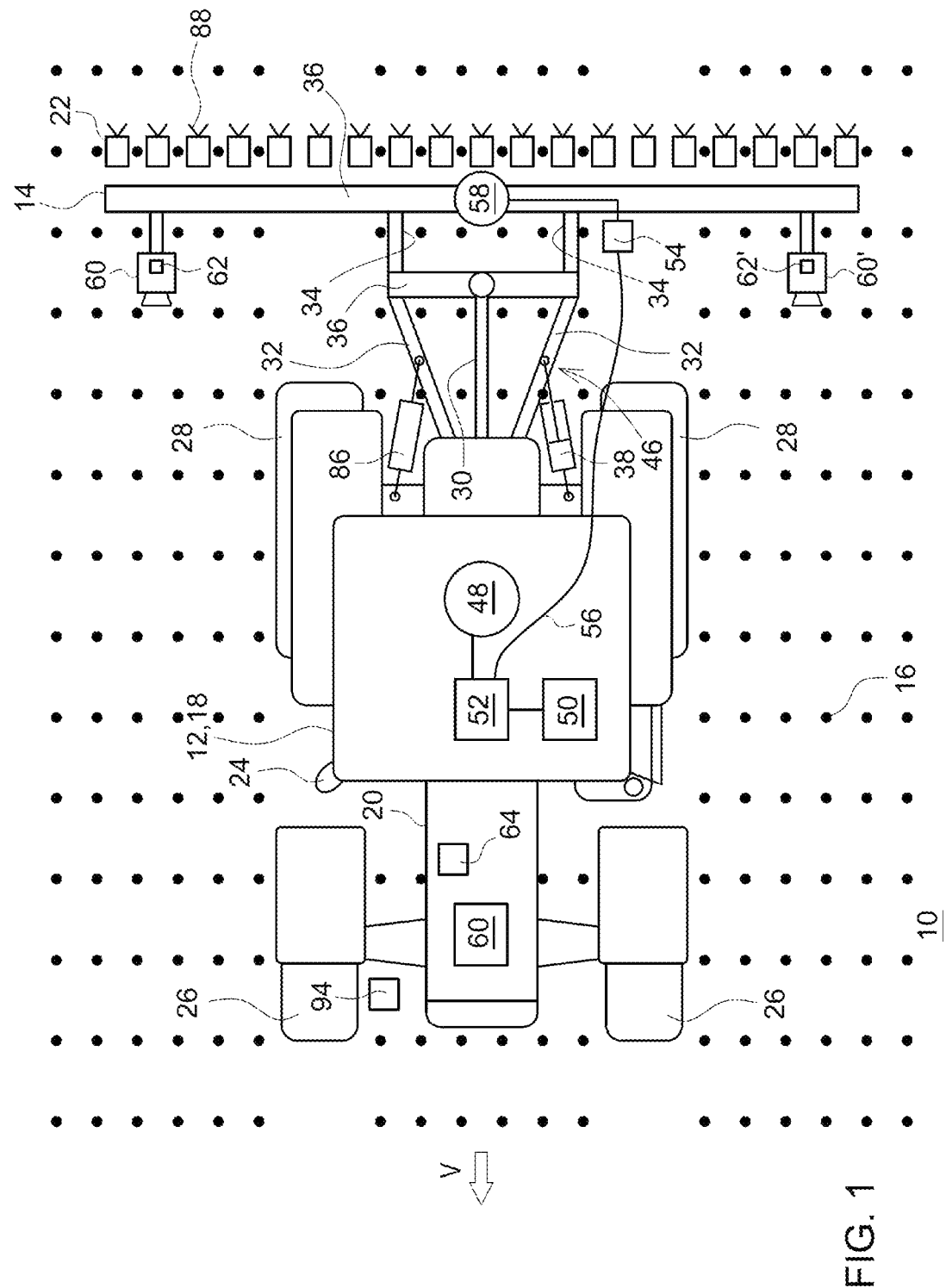
FIG. 1 shows a schematic plan view of an agricultural vehicle with a working implement with tools in the ground and a system for controlling the lateral position of the working implement during a working operation in a field.

The same reference characters are used to consistently identify the same elements in the figures. At least one exemplary embodiment of the subject-matter of the present disclosure can be understood on the basis of FIGS. 1 to 4.

A system for controlling a working implement connected to a vehicle is described, wherein the working implement comprises at least one tool for carrying out an agricultural operation, wherein the vehicle is equipped with an independent steering device for guiding the vehicle on an intended vehicle path, and wherein an actuator for controlling the lateral position of the working implement in relation to the vehicle is connected to an implement control unit that can be operated to control the actuator in such a way that the implement is moved on an intended path of the working implement and the implement control unit is set up to compensate for a lateral deviation of the vehicle from the intended path of the vehicle caused by external influences by controlling the actuator. The implement control unit is programmed to pre-set the actuator after a turning operation in a position in which the change of the external influences caused by the turning operation is compensated.

In other words, the problem is solved by placing the actuator in a position after the turning operation that compensates for the changed effect of the external influences. Therefore, if for example the working implement had to be adjusted upwards to the left before the turning operation by the actuator to compensate for the downward drift of the vehicle, the actuator will adjust the working implement uphill again after the turning operation, but now to the right, because the slope inclination and thus the lateral force applied to the vehicle has rotated by 180° relative to the vehicle and the implement after the turning operation. Analogous results occur in the case in which the vehicle is not steered exactly on the intended path by a GNSS receiver, but deviates to the left or right of it, so that the actuator adjusts the working implement to the right or left of the vehicle. After the resumption of work after the turning operation, the actuator will control the working implement using the implement control unit opposite to the position before the turning operation, i.e. the actuator moves the working implement to the right or left of the vehicle. The proposed procedure therefore avoids or reduces the errors that have so far occurred immediately after the turning operation, which are caused by the external influences acting on the vehicle and the working implement in a changed direction after the turning operation Immediately thereafter, the normal control process for setting the actuator is resumed.

The steering device of the vehicle may be connected to a position detection device for detecting the position of the vehicle and may be operated to steer the vehicle on the intended path of the vehicle on the basis of the specified position of the vehicle and intended path information.

The implement control unit can also be connected to a position detection device for detecting the position of the working implement and can be operated to guide the working implement on the intended path of the working implement based on the detected position of the working implement and the intended path information.

The intended path information for the steering device and/or the implement control unit may include a stored path and/or a desired position relative to a feature in a field, which may be a row of plants, for example.

The position detection device of the steering device and/or the implement control unit may include a receiver of a position determination system and/or a camera used to detect the feature in the field, and/or a rangefinder which may also interact with a feature in the field. For example, a design working with ultrasound, radar or other electromagnetic waves (for example ultra-wideband, UWB) is possible as a rangefinder. The rangefinder may interact with the plants or other features of the field, for example lanes, embankments or specially designed furrows or similar.

The implement control unit may be programmed to bring the actuator after the turning operation into a position that is mirrored in relation to a plane of symmetry of the working implement relative to the position adopted before the turning operation.

The implement control unit can be programmed to save the first position of the actuator before the turning operation and to retrieve it for pre-setting the actuator after the turning operation or to determine the position of the actuator to be controlled on the basis of a map of the field. In the map, the position of the actuator to be controlled can be stored location-specifically, or the current direction of travel and the resulting position of the actuator are determined using the current position of the working implement and the map.

The implement control unit can be programmed to detect a turning operation automatically. This can be done, for example, by identifying the turning operation using the signals of an inertial navigation unit, which may be integrated within a position determination receiver (see European Patent Appl. No. EP 1 475 609 A2), using a steering angle change that exceeds a certain angle, as is usually used when turning, but not when working on a field, or by a combination of implement lifting, steering angle and a change of speed and/or direction, or by a signal output by a headland management system indicating the turning operation.

The actuator thus controls the lateral position of the working implement in relation to the vehicle in order to ensure that the tools of the working implement are guided to the desired positions to carry out the operation. However, in some cases, due to external influences the vehicle cannot be guided exactly along an intended path. Such influences may be, for example, a slope inclined to the side, which allows the vehicle to drift downhill, or inaccuracies in the position determination (for example by a measurement-related or tectonically-induced offset between a recording of the intended path and the subsequent descent of the recorded intended path). In both cases, the vehicle does not drive exactly along the intended path on which the axis of symmetry of the vehicle lies, for example exactly between two rows of plants. Such deviations are in principle not problematic, since they are compensated by the actuator, which adjusts the working implement laterally relative to the vehicle. In the cases described, therefore, there is simply a permanent lateral offset between the vehicle and the working implement.

However, if the vehicle now performs a turning operation at the end of the field, when the working implement is lowered again after the turning operation the controller of the actuator will first place the actuator in a neutral position if it did not leave it in the position taken before the turning operation, and will then control the actuator, based on the signals of the camera and/or the GNSS receiver that are now coming in, in order to adjust the position of the working implement, because a correct adjustment of the actuator would usually be mirror-symmetrical to the previous adjustment due to the external influences, which are now acting in the opposite direction. In both cases, due inter alia to additional control fluctuations a significant deviation occurs between the actual position of the working implement and the desired position for a certain route, which may have a length of the order of 10 m. The working implement therefore does not work optimally over this route and can even lead to damage to the plants in unfavourable cases.

FIG. 1 shows a plan view of a field 10 in which a working operation is being carried out in an agricultural vehicle 12, which includes a self-driving vehicle and a connected working implement 14. In the field 10, plants 16 were sown or planted during a previous working step. Plants 16 are grown in a rectangular pattern, as shown, or in any other pattern, for example in a hexagonal or diamond pattern, or cover the field without a regular pattern, as if they were sown with a seed drill. The plants may have been sown or planted in any meaningful way, such as based on a receiver for a positioning system (GNSS, for example GPS) or using local sensors on the sowing or planting vehicle.

The vehicle 12 is a tractor 18 with a chassis 20 or frame that is supported on the ground on the means that are in contact with the ground in the form of steerable front wheels 26 and driven rear wheels 28. The vehicle 12 also includes an operator's cabin 24 and an engine 61 for driving the rear wheels 28 and optionally the front wheels 26 and a power take off shaft (not shown).

The working implement 14 comprises a cross member 36 that supports a number of row units 22, which are distributed side by side over the length of the cross member 36. The row units 22 include tools 88 (for example choppers or duck foot share tines for removing weeds from the soil of the field between the rows of plants 16 or any other tools for carrying out an agricultural operation, such as sowing, fertilizing, spraying, harvesting, etc.).

A three-point coupling 46 with lower linkages 32 and an upper linkage 30 is attached to the rear of the chassis 20. The linkages 30, 32 are attached with their rear ends to a transverse carrier beam 35, which in turn is attached to the cross member 36 of the working implement 14 by longitudinal carriers 34. The linkages 30 and 32 are each pivotably attached around respective vertical axes to the chassis 20 and on the carrier beam 35. An actuator 38 in the form of a hydraulic cylinder is linked with its first end to the chassis 20 and with its second end to one of the lower linkages 32 and can thus move the carrier beam 35 and thus the entire working implement 14 like a parallelogram in the lateral direction, i.e. horizontally and transversely to the forward direction V. The actuator 38 is controlled by a valve block 50, which is connected to an electronic vehicle control unit 52. The electronic vehicle control unit 52 is set up to obtain control signals via a bus system 56 (which works primarily according to the ISO 11783 standard, which sends controls instructions from an electronic implement control unit 54 to the vehicle control unit 52. The implement control unit 54 can thus control the lateral position of the working implement 14, as described in detail in German Patent Appl. No. DE 102016212201 A1, the contents of which are included by reference in the present documents, as well as explained in more detail with reference to FIG. 2. A sensor 86 detects the angle around the vertical axis of one of the lower linkages 32 relative to the chassis 20 and thus provides a signal regarding the lateral position of the working implement 14 relative to the chassis 20. It should be noted that the sensor 86 could be integrated into the housing of the actuator 38 (see European Patent Appl. No. EP 1210854 A1). In a different embodiment, actuators 38 could be used between the chassis 20 and each lower linkage 32, with integrated or separate sensors 86, wherein the actuators 38 are single-acting or double-acting.

In another possible embodiment, the working implement 14 may be connected by a so-called side shift frame to the vehicle 12, which uses an actuator for lateral position control of the working implement 14, as described for example in European Patent Appl. No. EP 2283719 A2 and US Patent Publication No. 20130110358, the contents of which are included by reference in the present documents. It would also be possible to support the working implement 14 on wheels and to connect it to a coupling of the vehicle 12 with a drawbar and to actively control the angle of the drawbar and/or the steering angle of the wheels of the working implement 14 with an actuator 38 (see US Patent Publication No. 20130186657, included by reference in the present documents.

Thus, the lateral position of the working implement 14 is controlled by the implement control unit 54 using the actuator 38. Since the working implement 14 should always be moved into a lateral position above the field 10 at which the row units 22 with the tools 88 in contact with the ground are arranged in their appropriate positions between the rows of plants 16, in order to carry out the desired agricultural operation and to avoid damage to the plants (or into any meaningful desired position for carrying out an agricultural operation, such as sowing, planting, feeding, or harvesting the plants 16 or parts thereof), the working implement 14 is automatically guided along the rows of plants 16 by the implement control unit 54 based on signals of a first camera 60 with an image processing system 62, an optional second camera 60' with an image processing system 62' and an optional receiver 58 for receiving a satellite-based positioning system, such as GPS, Glonass, or Galileo. The receiver 58 is attached to the cross member 36 of the working implement 12 or to another suitable place there. The image processing systems 62, 62' could also be integrated into the implement control unit 54. In a different embodiment, the implement control unit 54 could also be integrated into the vehicle control unit 52, or it could control the actuator 38 directly (not via the vehicle control unit 52).

The cameras 60, 60' are attached to the cross member 36 of the working implement 14 and view the field 10 in front of the working implement 14. The image processing systems 62, 62' extract from the images the position of the rows of plants 16 relative to the camera 60, 60' and compare this position with a pre-stored or programmed desired target position of the plants 16 relative to the camera 60, 60' or vice versa. Thus, a first signal is provided to the implement control unit 54 that indicates a possible deviation between the current lateral position and the desired lateral position of the working implement 14. The signals of the image processing systems 62, 62' can be improved by signals of the receiver 58 or can be replaced (in particular, if the row units 22 are seed units with furrow openers with tools 88 in contact with in the ground), using a pre-stored map with the current or desired position of the plants 16 (or of their rows) as a reference. Merging the signals of the image processing systems 62, 62' and the receiver 58 can be based on the relative quality of the signals.

According to this, the implement control unit 54 controls the actuator 38 in order to guide the working implement 14 with its row units 22 along a desired path based on the first signal. In the embodiment shown, this desired path is determined by the position of the plants 16 on the field and the actuator 38 is guided by the implement control unit 54 (using suitable software) based on the signals of the camera 60 and optionally 60' so that the row units 22 move between the plants 16 (according to the position of the plants 16 detected by the cameras 60, 60'). The desired path can alternatively or additionally be stored in advance in a memory of the implement control unit 54 and the actuator 38 can be controlled based on the desired path. Both options and their combination are essentially described in US Patent Publication No. 20020193928, the content of which is included in the present documents by reference. An embodiment of a lateral guide of the working implement 14 based on cameras 60, 60' and a receiver 58 is also described in more detail in European Patent Appl. No. EP 2910098 A1, the contents of which are included by reference in the present documents.

The front wheels 26 of the vehicle 12 will be automatically steered in such a way that the vehicle control unit 52 controls a steering actuator 64 that controls the steering angle of the front wheels 26 based on signals from a positioning system with a receiver 48 for receiving signals from a satellite-based positioning system, such as GPS, Glonass, or Galileo, using a pre-stored map showing the data regarding the locations of the plants 16 or a path (driving lane) used for driving over the field as a reference, wherein a steering angle sensor 94 can provide feedback values. The receiver 48, which may optionally include an inertial navigation system as described in European Patent Appl. No. EP 1475609 A2, is mounted on the roof of the cabin 24. Alternatively or additionally, the vehicle 12 can be steered based on a camera (not shown) which is attached to the vehicle 12 and connected to an image processing system that captures the rows of plants 16 in front of the vehicle 12. It should also be noted that in the case of a vehicle 12 based on crawler drives, its steering angle could be affected by speed differences of the crawler drives on both sides of the vehicle 12, and that in the case of articulated steering, an actuator would control the steering angle of the vehicle 12 by rotating the front and rear part of the vehicle 12 around a vertical connecting axis.

Figure 2:
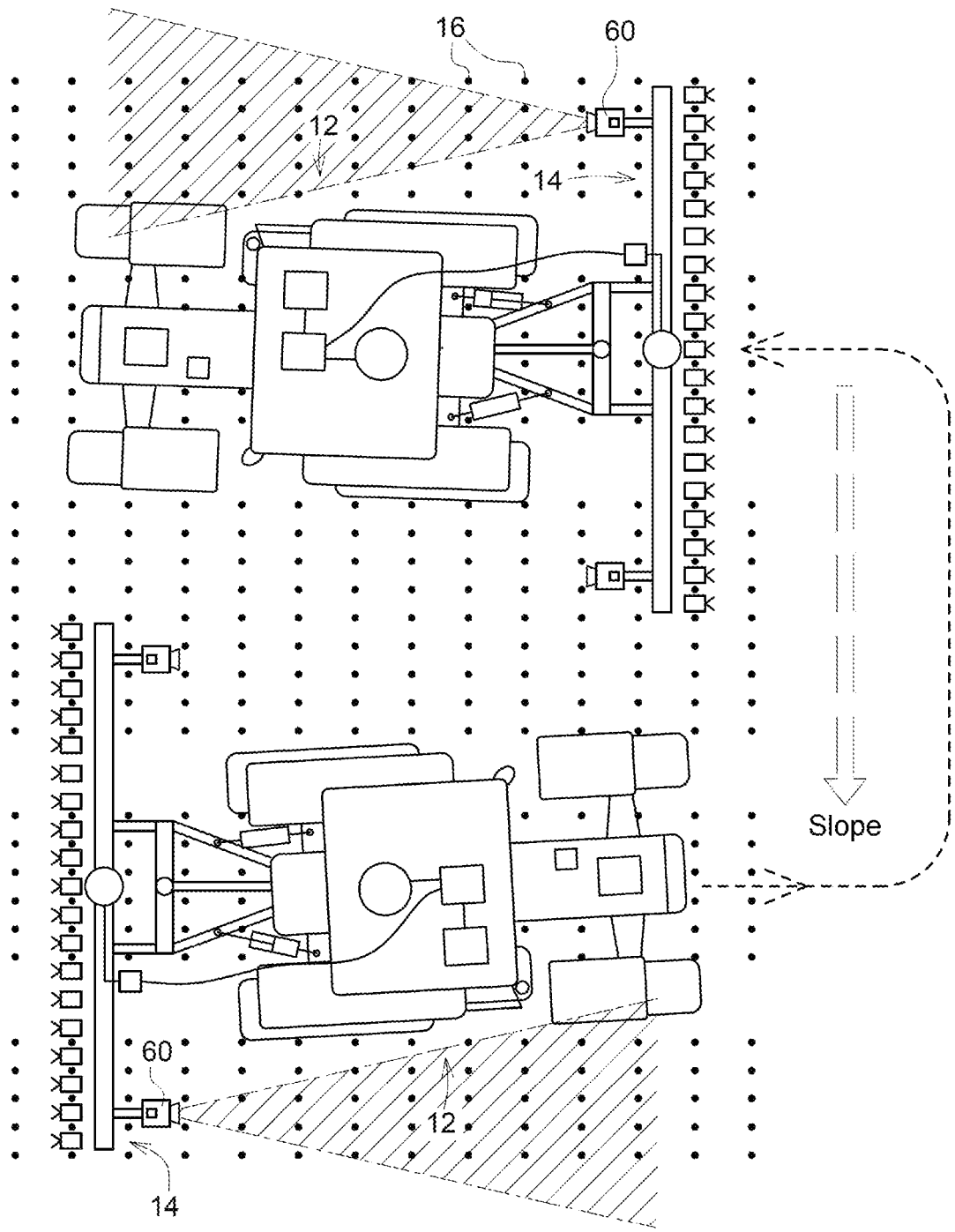
FIG. 2 shows a plan view of a vehicle according to the prior art with the working implement before and after a turning operation when working on a side slope.

FIG. 2 shows a vehicle 12 with a working implement 14 at work on a side slope that slopes downwards in FIG. 2. The automatically steered vehicle 12 drifts downwards with its axis of symmetry relative to the centre of the plant rows 16 due to the downward slope, i.e. to the right relative to the direction of travel. The working implement 14 is thus adjusted to the left (i.e. uphill) by the actuator 38 when the vehicle 12 is moving to the right and is adjusted to the right (also uphill) when the vehicle 12 is moving to the left.

Figure 3:
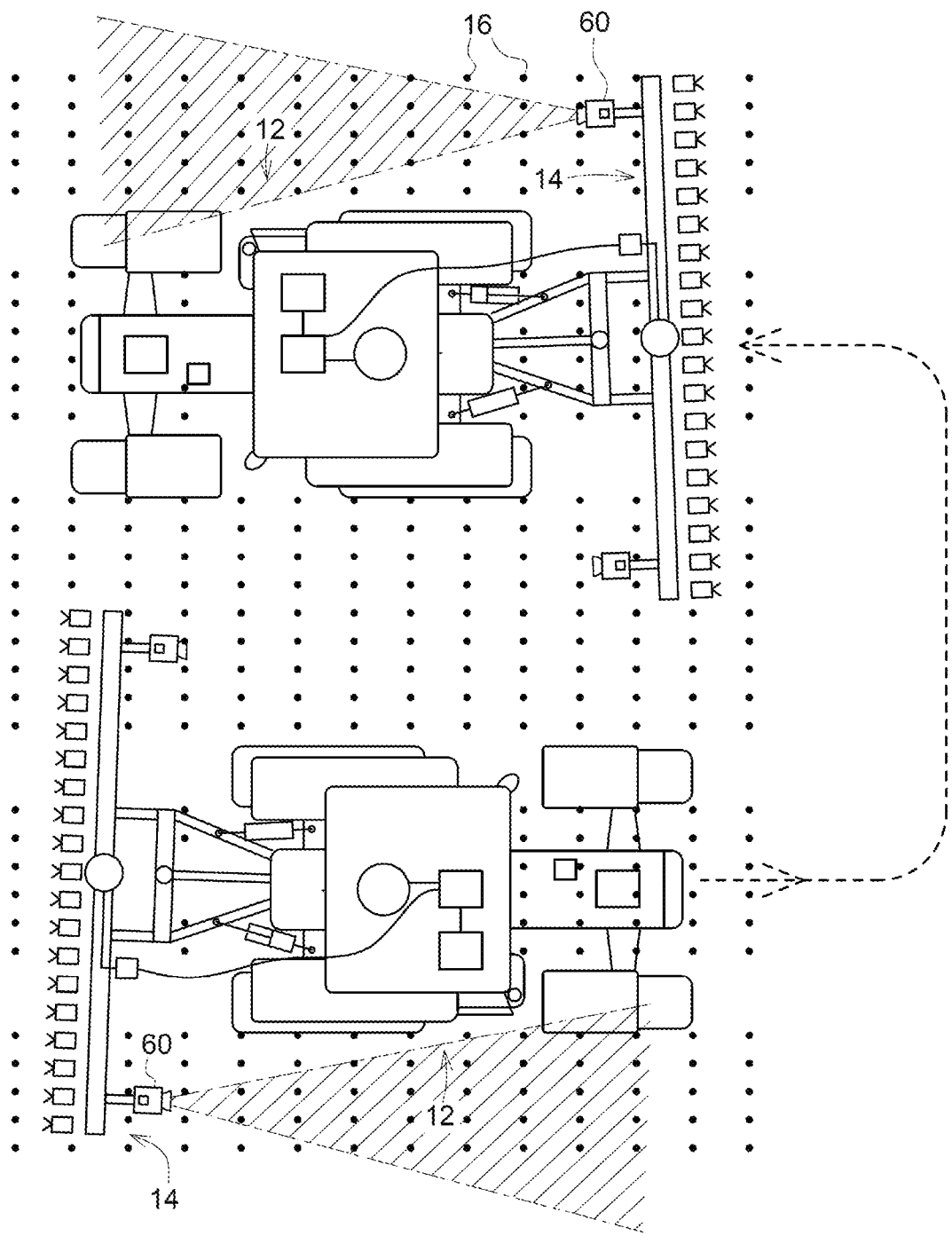
FIG. 3 shows a plan view of a vehicle according to the prior art with the working implement before and after a turning operation during a working operation with GNSS-based steering in the event of a fault of the GNSS.

Similarly, FIG. 3 shows a vehicle 12 that is automatically steered on the basis of the signals of the receiver 48 with a working implement 14 at work on the level, wherein however there is a lateral offset between the stored intended path, based on which the vehicle 12 is steered, and the actual position of the plant rows 16. This offset may be caused by different accuracy or different reception conditions of the receivers 48 used in sowing and in the operation in FIG. 3, or by a tectonic shift of the field 10 between the seeding process and the operation. The vehicle 12 is driving in FIG. 3 with its axis of symmetry in a position shifted downwards relative to the centre of the plant rows 16, which the actuator 38 compensates by shifting the working implement 14 upwards. In the lower part of FIG. 3, the actuator 38 therefore pulls the working implement 14 to the left and in the upper part to the right.

Thus, the position of the actuator 38 in the two situations shown in FIGS. 2 and 3 depends on external influences, namely on the side slope in FIG. 2 and on the offset in FIG. 3 caused by the receiver 48. These effects lead to the changed settings of the actuator 38 shown when there is a change in the direction of travel of the vehicle 12 after a turning operation. In the prior art, the consideration of said influences is carried out by the camera 60, which controls the actuator 38 in such a way that the working implement 14 is guided into the intended position relative to the rows of plants 16. However, after a turning operation, as indicated in FIGS. 2 and 3 by the arrows, the working implement 14 would initially remain in the position it would have had before the turning operation, which means that it is initially in a position in which it does not do any useful work in the field or even damages the plants.

Figure 4:
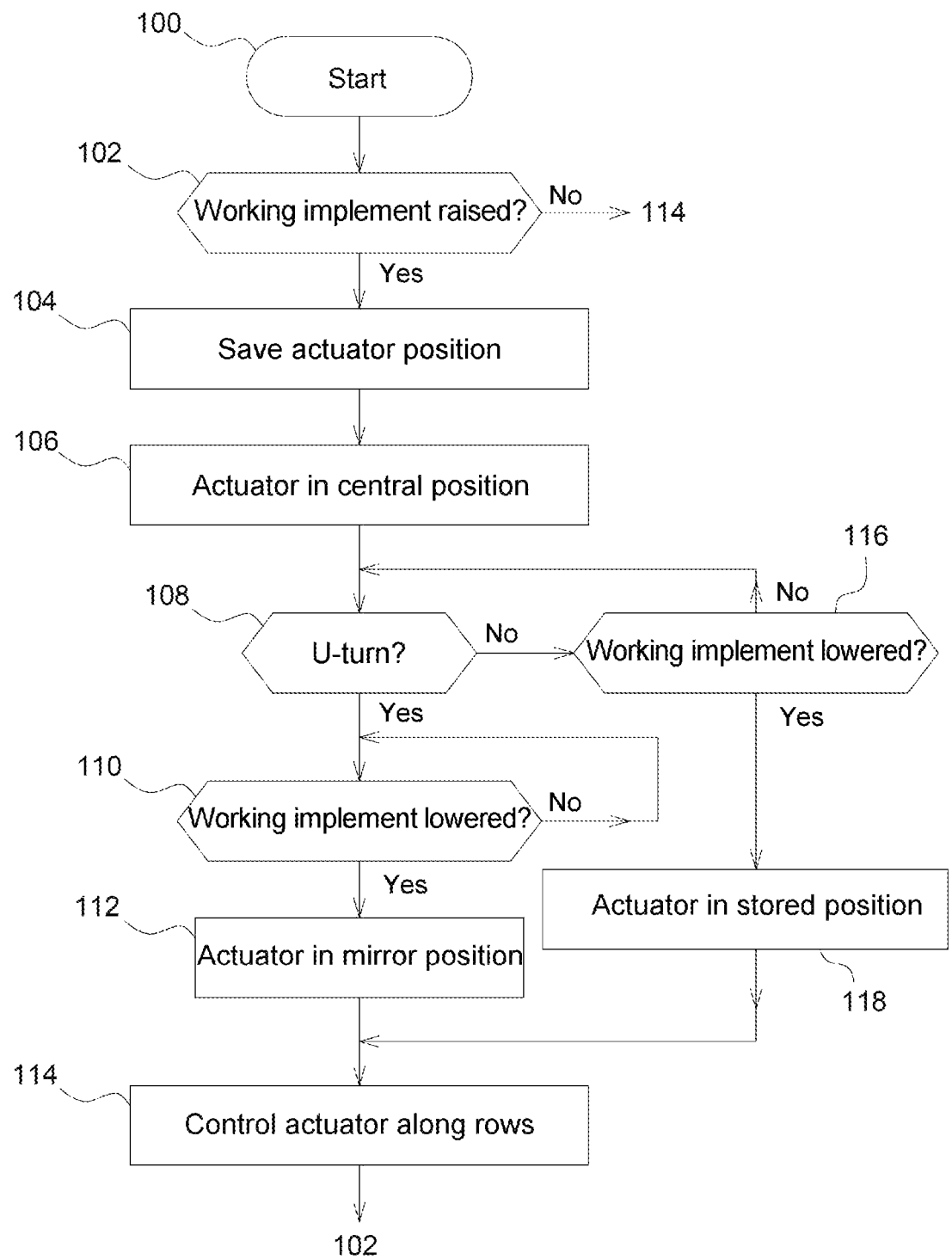
FIG. 4 shows a flowchart according to which an implement control unit proceeds.

To reduce or avoid this problem, the implement control unit 54 works according to the flowchart of FIG. 4. After the start in step 100, it is first queried whether the working implement 14 is raised, for which by using the bus system 56 the status of an adjustable length upper linkage 30 or the lifting height of the three-point coupling (for example a power lifter for lifting one or both of the lower linkages 32) can be queried or signals of the camera 60, 60' or the receiver 48, 58 can be accessed. If the working implement 14 is not raised, step 114 is carried out, in which the actuator 38 is controlled in the manner described above in order to guide the working implement 14 over the field 10 along the intended path.

However, if the working implement 14 is raised, step 104 follows, in which the current position of the actuator 38 is stored. In the following step 106, the implement control unit 54 commands the actuator 38 to go into a central or neutral position, in which the axis of symmetry (longitudinal central axis) of the working implement 14 coincides with the axis of symmetry (longitudinal central axis) of the vehicle 12, i.e. the working implement 14 is laterally aligned with the vehicle 12. In the raised position, the working implement 14 is therefore always in the central or neutral position. Step 108 follows, in which a query is made as to whether a turning operation is currently taking place. This can be detected using the signals of the camera 60, 60' or the receiver 48, 58 or the inertial navigation sensors arranged therein or with the steering signal of the vehicle 12 transmitted via the bus system 56 to the implement control unit 54 or by means of a combination of the detected lifting of the working implement 14, the steering angle of the vehicle 12 and the change of speed and/or the direction of travel of the vehicle 12 (see German Patent Appl. No. DE 10 2014 202 181 A1).

If in step 108 it is determined that a turning operation is not being carried out, step 116 follows, in which a query is made as to whether the working implement is lowered, and otherwise step 110 is carried out. If in step 116 the working implement is not lowered, step 108 follows again and otherwise step 118 follows, in which the working implement 14 is moved to the position stored in step 104. Here it is thus possible to temporarily lift the working implement 14, where the actuator 38 brings it into the neutral position and lowers it again, for example to lift it away over obstacles or to carry out fault correction or adjustment work or a visual inspection on the working implement 14.

In step 110, a query is made as to whether the working implement 14 is lowered. If this is not the case, step 110 follows again. Otherwise step 112 follows, in which the actuator 38 is commanded by the implement control unit 54 to move to a position that is (mirror) symmetrical to the position stored in step 104. The position changes of the actuator 38 shown in FIGS. 2 and 3 are thus carried out automatically in step 112, based on the recognition of the turning operation in step 108. If this is not the case, then step 112 follows and otherwise step 114 follows, followed again by step 102.

By using the described procedure, therefore, a pre-control of the actuator 38 is carried out after the turning operation, which automatically compensates for the changing influence of the external effect (slope, GNSS error, etc.) due to the U-turn.

It should also be noted that in step 104 in the case of control of the actuator 38 based on the receiver 58, the position of the receiver 58 and/or the corresponding time can be stored, i.e. entered into a map or into a pre-planned lane. In step 110 the position of the actuator 38 stored in step 104 does not have to be resorted to, but the actuator 38 can be controlled based on stored data for the position to be controlled after the turning operation, wherein the data were obtained for example in another operation on field 10, for example during the previous year's work operation, or any other information can be used to indicate the position and/or direction of travel of the new lane after the U-turn. It is also possible to plan the path to be taken in the field in advance and when driving along the path it is possible to derive the deflection of the actuator 38 to be controlled on the basis of a map of the path, whether indirectly on the basis of the direction of travel or directly by entering the deflection of the actuator 38 into the map.

In another embodiment, the steps of FIG. 4 are controlled by a headland management system of the vehicle 12, which on the one hand automatically commands the steering actuator 64 and on the other hand causes the lifting and lowering of the working implement 14 in the headland and also carries out the described preset of the actuator 38 after the turning operation.

The camera 60, 60' can be replaced or supplemented by a rangefinder (for example working with ultrasound, radar or other electromagnetic waves), which can also interact with a feature in the field, for example lanes, embankments or specially designed furrows or similar.

Finally, it should be noted that the turning operation does not necessarily have to take place in such a way that successive crossings of the field 10 are directly adjacent to each other, but one or more lanes can also be left out at first and driven over later. This does not change the proposed approach.

Steps of the FIG. 4:
 100 Start
 102 Working implement raised?
 104 Save actuator position
 106 Actuator in central position
 108 U-turn?
 110 Working implement lowered?

112 Actuator in mirror position
114 Control actuator along rows
116 Working implement lowered?
118 Actuator in stored position Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of a skilled artisan in light of this disclosure. In addition, those skilled in the art will appreciate that the mechanisms of the subject matter described herein are capable of being distributed as a program product in a variety of forms, and that an illustrative embodiment of the subject matter described herein applies regardless of the type of signal bearing medium used to carry out the distribution. Examples of a signal bearing medium include, but are not limited to, the following: an edge computing module or device; a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a computer system or computing element (or portion thereof) such as, but not limited to, one or more or some combination of: a visual organizer system, a request generator, an Internet coupled computing device, a computer server, etc. In one example, the computer system and/or the computing element may manipulate and transform information and/or data represented as physical (electronic) quantities within the computer system's and/or computing element's processor(s), register(s), and/or memory(ies) into other data similarly represented as physical quantities within the computer system's and/or computing element's memory(ies), register(s) and/or other such information storage, processing, transmission, and/or display components of the computer system(s), computing element(s) and/or other electronic computing device(s). Under the direction of computer-readable instructions, the computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. A system for controlling a working implement connected to a vehicle, the system comprising:
   at least one tool mounted on the working implement, the working implement and the at least one tool configured to perform an agricultural operation;
   a vehicle control unit associated with the vehicle, the vehicle control unit configured to guide the vehicle on an intended vehicle path;
   an implement control unit to control a lateral position of the working implement relative to the vehicle, the implement control unit to control an actuator operatively coupled to the working implement to move the working implement on an intended implement path, the implement control unit to compensate for a lateral deviation of the vehicle from the intended vehicle path of the vehicle through actuation of the actuator; and
   wherein the implement control unit is programmed to pre-set the actuator for a first position after a turning operation in which effects of the turning operation are compensated, the implement control unit to move the actuator to the first position after the turning operation, the first position mirrored about a plane of symmetry of the working implement relative to a second position of the actuator before the turning operation.

2. The system of claim 1, wherein the vehicle control unit is configured to steer the vehicle on the intended vehicle path based on a detected position of the vehicle and intended vehicle path information.

3. The system of claim 2, wherein the detected position of the vehicle is detected using at least one of a receiver of a positioning system, a camera, or a rangefinder.

4. The system of claim 1, wherein the implement control unit is configured to guide the working implement on the intended implement path based on a detected position of the working implement and intended implement path information.

5. The system of claim 4, wherein the intended implement path information includes at least one of a stored path or an intended implement position relative to a feature on a field.

6. The system of claim 5, wherein the feature on the field is a row of plants.

7. The system of claim 1, wherein the implement control unit is programmed to store the second position of the actuator before the turning operation and to determine the first position of the actuator based on a map of a field.

8. The system of claim 1, wherein the implement control unit is programmed to automatically detect the turning operation.

9. A method for controlling a working implement connected to a vehicle, the method comprising:
   guiding, using a vehicle control unit associated with the vehicle, the vehicle on an intended vehicle path;
   controlling, using an implement control unit, a lateral position of the working implement relative to the vehicle, the implement control unit to control an actuator operatively coupled to the working implement to move the working implement on an intended implement path, the implement control unit to compensate for a lateral deviation of the vehicle from the intended vehicle path of the vehicle through actuation of the actuator; and
   pre-setting, using the implement control unit, the actuator for a first position after a turning operation in which effects of the turning operation are compensated, the implement control unit to move the actuator to the first position after the turning operation, the first position mirrored about a plane of symmetry of the working implement relative to a second position of the actuator before the turning operation.

10. The method of claim 9, further including steering, using the vehicle control unit, the vehicle on the intended vehicle path based on a detected position of the vehicle and intended vehicle path information.

11. The method of claim 10, further including detecting the detected position of the vehicle using at least one of a receiver of a positioning system, a camera, or a rangefinder.

12. The method of claim 9, further including guiding, using the implement control unit, the working implement on the intended implement path based on a detected position of the working implement and intended implement path information.

13. The method of claim 12, wherein the intended implement path information includes at least one of a stored path or an intended implement position relative to a feature on a field.

14. The method of claim 9, further including storing, using the implement control unit, the second position of the actuator before the turning operation and determining the first position of the actuator based on a map of a field.

15. A non-transitory computer readable medium comprising instructions that, when executed, cause processor circuitry to:
   guide a vehicle on an intended vehicle path, a working implement corrected to the vehicle;
   control a lateral position of the working implement relative to the vehicle, the processor circuitry to control an actuator operatively coupled to the working implement to move the working implement on an intended implement path, the processor circuitry to compensate for a lateral deviation of the vehicle from the intended vehicle path of the vehicle through actuation of the actuator; and pre-set the actuator for a first position after a turning operation in which effects of the turning operation are compensated, the processor circuitry to move the actuator to the first position after the turning operation, the first position mirrored about a plane of symmetry of the working implement relative to a second position of the actuator before the turning operation.

16. The non-transitory computer readable medium of claim 15, wherein the instructions, when executed, cause the processor circuitry to steer the vehicle on the intended vehicle path based on a detected position of the vehicle and intended vehicle path information.

17. The non-transitory computer readable medium of claim 16, wherein the instructions, when executed, cause the processor circuitry to detect the detected position of the vehicle using at least one of a receiver of a positioning system, a camera, or a rangefinder.

18. The non-transitory computer readable medium of claim 15, wherein the instructions, when executed, cause the processor circuitry to guide the working implement on the intended implement path based on a detected position of the working implement and intended implement path information.

19. The non-transitory computer readable medium of claim 18, wherein the intended implement path information includes at least one of a stored path or an intended implement position relative to a feature on a field.

20. The non-transitory computer readable medium of claim 15, wherein the instructions, when executed, cause the processor circuitry to store the second position of the actuator before the turning operation and determine the first position of the actuator based on a map of a field.

* * * * *